United States Patent [19]

Mabboux et al.

[11] Patent Number: 4,651,880
[45] Date of Patent: Mar. 24, 1987

[54] CALIBRATING DISTRIBUTOR OF CYLINDRICAL MEMBERS

[75] Inventors: Marcel Mabboux; Claude Mercier, both of Manosque, France

[73] Assignee: Commissariat a l'Energie Atomique, France

[21] Appl. No.: 829,522

[22] Filed: Feb. 14, 1986

[30] Foreign Application Priority Data

Feb. 27, 1985 [FR] France .................................. 85 02844

[51] Int. Cl.⁴ .............................................. B07C 5/06
[52] U.S. Cl. .................................... 209/557; 209/625; 209/680; 221/234
[58] Field of Search ............... 209/548, 555, 557, 625, 209/627, 628, 629, 630, 659, 680, 684; 221/233, 234; 33/502

[56] References Cited

U.S. PATENT DOCUMENTS

| | | | |
|---|---|---|---|
| 208,903 | 10/1878 | Gill | 209/548 |
| 2,307,957 | 1/1943 | Reynolds | 221/233 X |
| 2,364,187 | 12/1944 | Birdsall | |
| 3,221,152 | 11/1965 | Jones | |
| 3,625,357 | 12/1971 | Ochs et al. | 209/625 |
| 3,785,487 | 1/1974 | Spencer | 209/625 X |
| 4,204,951 | 5/1980 | Moser et al. | 209/625 |
| 4,402,412 | 9/1983 | Wood | 209/625 |

FOREIGN PATENT DOCUMENTS

| | | |
|---|---|---|
| 0631494 | 11/1963 | Belgium . |
| 0038378 | 10/1981 | European Pat. Off. . |
| 2389096 | 11/1978 | France . |
| 45-32510 | 10/1970 | Japan ................................. 209/680 |

Primary Examiner—Robert B. Reeves
Assistant Examiner—Edward M. Wacyra

[57] ABSTRACT

A calibrating distributor of cylindrical members incorporating a cylindrical member supply station, a drum for transferring the members between the supply and a distribution station, the drum having equidistant cavities, each of which receive one of the members, a calibrating plate to transfer the cylindrical members having a diameter exceeding a maximum permitted diameter between the distribution station and an ejection station, the plate having equidistant calibrated holes, which are at least partly frustum-shaped, whose smallest diameter is equal to the maximum permitted diameter, a drive for the stepwise rotation of the transfer drum and the calibrating plate, and a pusher for forcing the cylindrical members contained in the cavities into and through calibrated holes whereby the members having a diameter exceeding the maximum permitted diameter remain jammed in the holes and are ejected at the ejection station.

6 Claims, 11 Drawing Figures

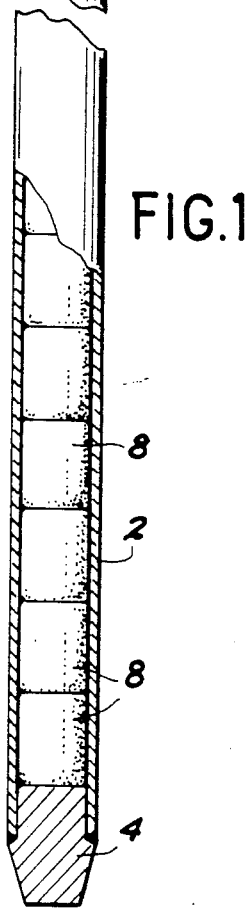
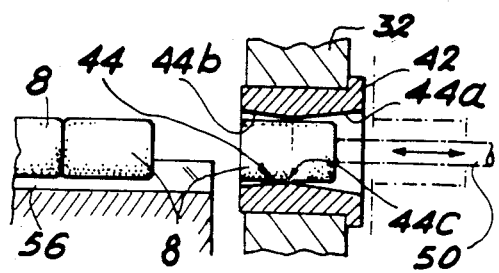
FIG. 7A
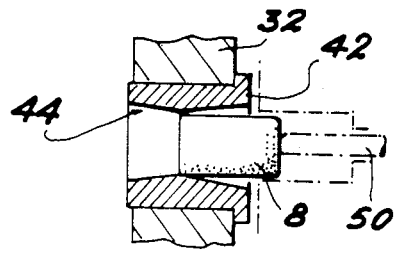
FIG. 7B
FIG. 1
FIG. 7C 4,651,880

CALIBRATING DISTRIBUTOR OF CYLINDRICAL MEMBERS

BACKGROUND OF THE INVENTION

The present invention relates to a calibrating distributor of cylindrical members. It applies in a non-limitative manner to the formation of columns of radio active fuel nuggets or pellets.

The core of a nuclear reactor has a large number of fuel rods arranged in bundles in assemblies. They form the seat of a nuclear reaction, which is the basis of the operation of a reactor.

A fuel rod is shown in simplified form and in longitudinal section in FIG. 1. The rod comprises a tubular sheath 2, sealed at its ends by two plugs 4, 6 and into which is introduced a column of fuel nuggets 8. Generally a rod has several dozen nuggets 8.

The clearance between the sheath 2 and the nuggets 8 is very small, which requires a careful calibration of the diameter of the fuel nuggets. However, the latter, which are mass produced, are not straightened after fritting and are subject to diameter variations, so that selective controls thereof are necessary.

SUMMARY OF THE INVENTION

One of the objectives of the invention is to propose a high speed calibrating distributor for cylindrical members, such as fuel nuggets able to form columns of cylindrical members, whose diameter is equal to or smaller than the maximum accepted diameter, whilst discarding as waste the members which do not conform.

More specifically the present invention relates to a calibrating distributor for cylindrical members comprising a cylindrical member supply station, a distribution station for said members, an ejection station for the cylindrical members whose diameter exceeds a maximum accepted diameter, a barrel for transferring these members between the supply station and the distribution station, said barrel having equidistant cavities, each of which can receive one of the said members, a calibrating plate able to transfer between the distribution station and the ejection station the cylindrical members whose diameter exceeds the maximum accepted diameter, said plate having at least partly frustum-shaped, equidistant calibrated holes, whose internal diameter is equal to the maximum accepted diameter, means for the stepwise rotation of the transfer drum and the calibrating plate and for successively passing each cavity in front of the supply station and the distribution station and each hole in front of the distribution station and the ejection station, in such a way that a cavity and a hole are aligned opposite to the distribution station, the distribution station having means for forcing the cylindrical members contained in the cavities through the calibrated holes with a maximum predetermined force, in such a way that only the cylindrical members with a diameter smaller or substantially equal to the maximum accepted diameter pass through said holes, the members having a diameter larger than said maximum diameter remaining jammed in said holes and the ejection station has means for ejecting the cylindrical members jammed in said hole.

More specifically, the means in the distribution station for forcing the cylindrical members comprise a mobile frame guided in translation by a fixed slide, whose axis is parallel to said aligned hole and cavity, drive means permitting an alternating movement of the mobile frame, a first end of a lever being pivotably mounted on the mobile frame about a rotation axis perpendicular to said slide axis, the other end of the lever being pivotably mounted at the end of a distributor piston, said piston being mobile in translation and performs an alternating movement in an axis coinciding with the aligned cavity and hole facing the distribution station.

Advantageously, stress limiting means are placed between the assembly constituted by said lever and said distributor piston, the stress limiting means not transmitting to the piston the movement of the mobile frame when the piston is blocked by a cylindrical member having a diameter exceeding the maximum accepted diameter and jammed in a hole of the calibrating plate.

Preferably, the means of the ejection station comprise an ejector piston fixed to said mobile frame parallel to the aligned hole and cavity so as to successively penetrate each of the holes of the calibrating plate and eject the cylindrical members jammed in said holes.

Advantageously, the transfer drum and calibrating plate have in each case a toothed ring, the rings of the barrel and the plate forming a gear.

During operation, a portion of the nugget can rest on the bottom of one of the cavities. When a new nugget is introduced into said cavity, it can pass beyond the same and lead to an operating malfunction of the calibrating distributor according to the invention.

Another objective of the invention is to provide a calibrating distributor having a device able to detect excessive lengths of the cylindrical members and place on the transfer drum. This device has a plate which is free in rotation and whereof the wall facing the barrel is located at a uniform distance from the inner end of each of the cavities corresponding to a maximum permitted length of the cylindrical members. This plate has a cutout which normally faces the supply station and means for detecting a rotation of said plate by a cylindrical member projecting beyond said permitted maximum length.

BRIEF DESCRIPTION OF THE DRAWINGS

The invention is described in greater detail hereinafter relative to non-limitative embodiments and the attached drawings, wherein show :

FIG. 1, already described, a simplified view in longitudinal section of a fuel rod.

FIGS. 7A, 7B and 7C in longitudinal section a calibrated hole of the calibrating plate and the nuggets introduced into it.

DETAILED DESCRIPTION OF THE PREFERRED EMBODIMENTS

Figure 2:
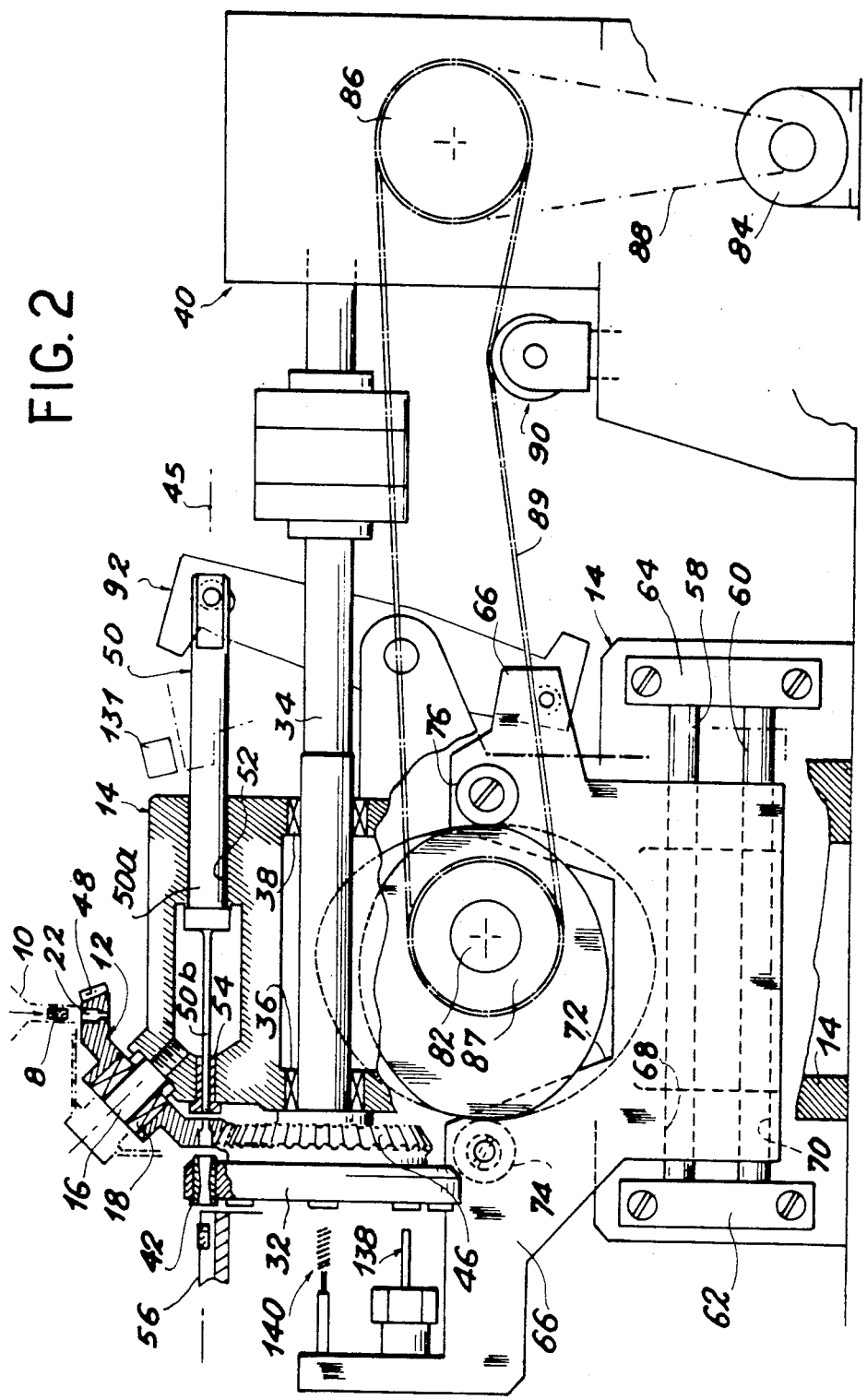
FIG. 2, a side view with a partial section of the calibrating distributor according to a preferred embodiment.
Figure 3:
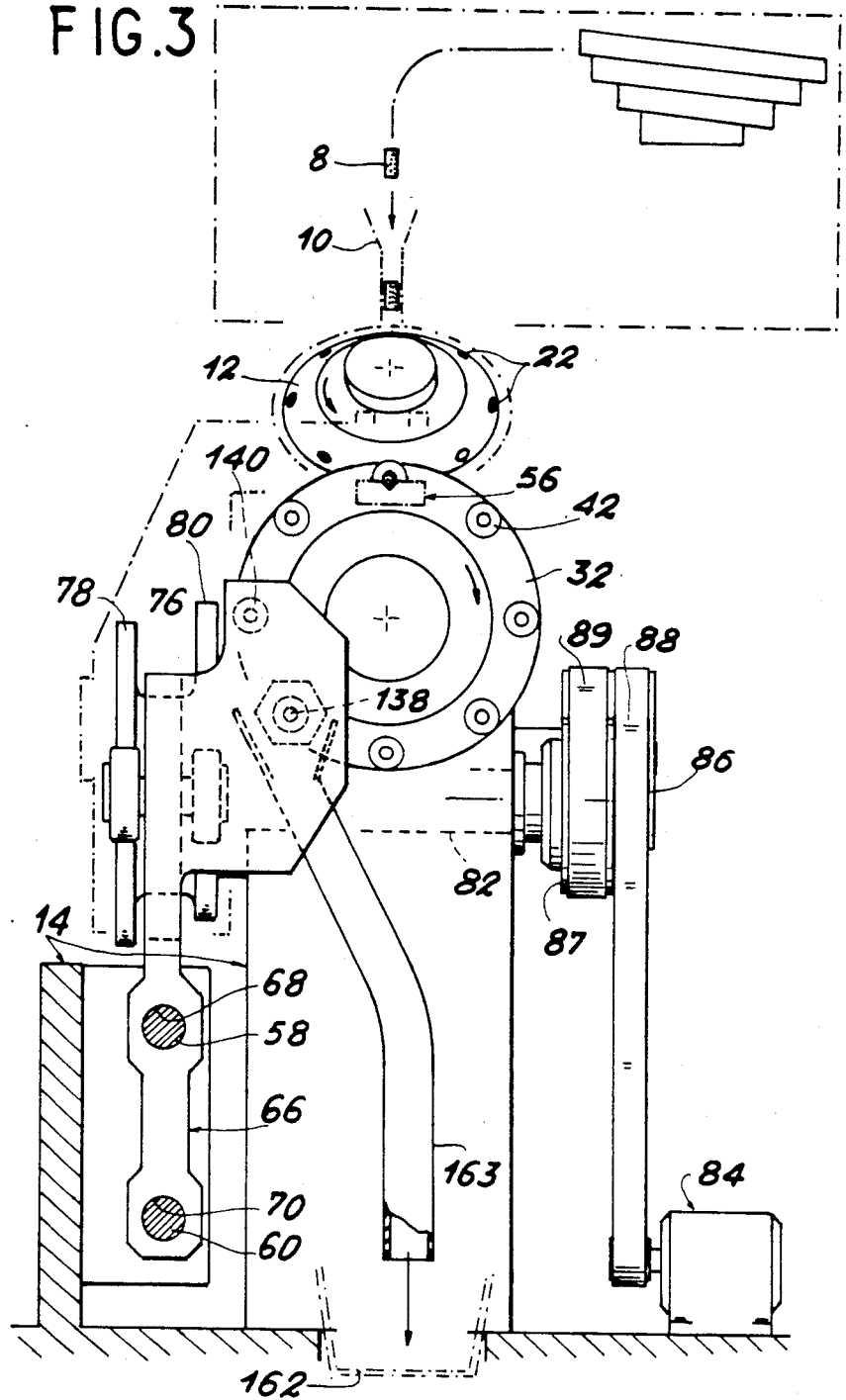
FIG. 3, a front view of the calibrating distributor of FIG. 2.
Figure 4:
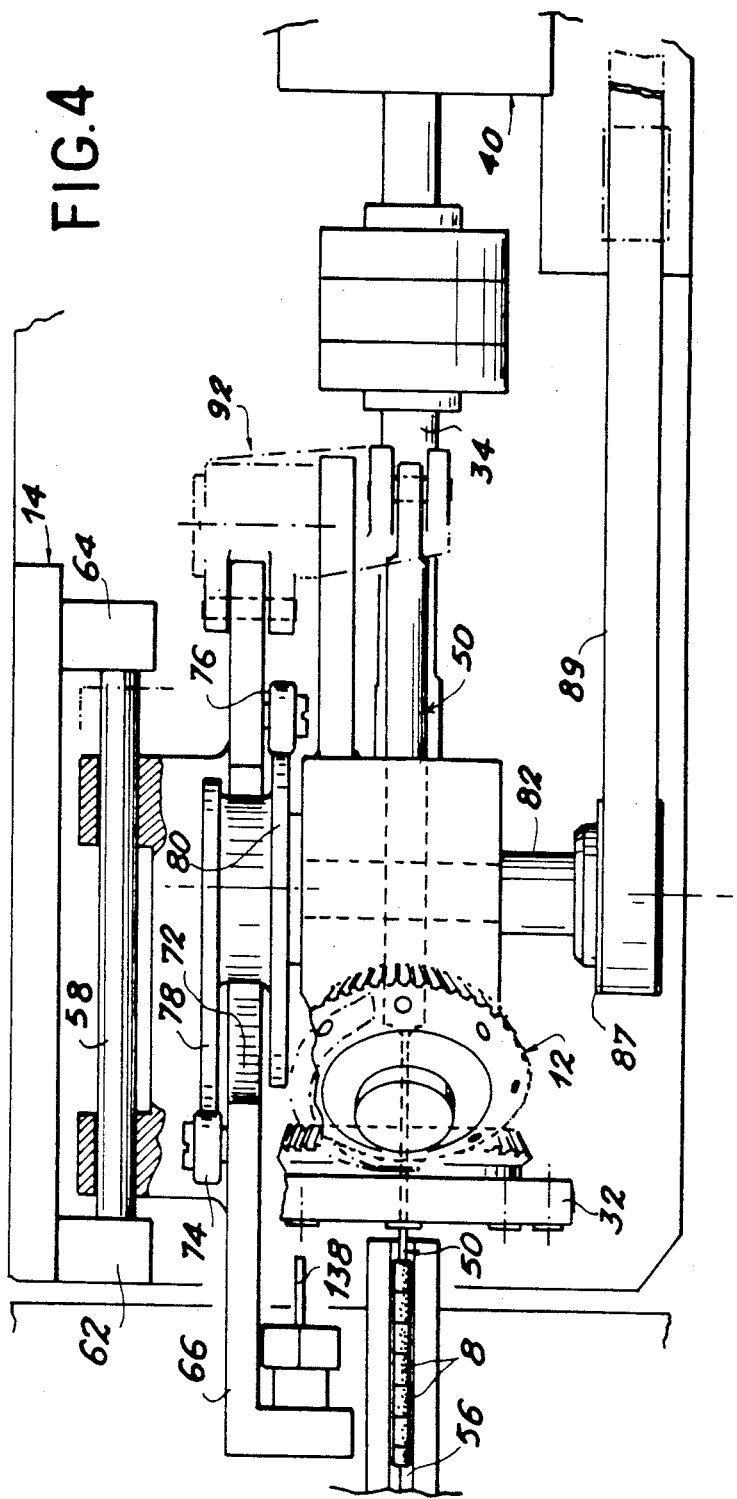
FIG. 4, a plan view of the calibrating distributor of FIGS. 2 and 3.

A preferred embodiment of the calibrating distributor according to the invention is shown in FIGS. 2, 3 and 4.

The calibrating distributor firstly has a station for supplying the cylindrical members such as the fuel nuggets 8. This station more particularly comprises a vibrating bowl and a supply chute 10, whereof the lower end is vertical. The internal diameter of chute 10 is substantially equal to the diameter of the nuggets 8, which enables the latter to position themselves vertically (i.e. their revolution axis is vertical) at the lower end of said chute 10.

A transfer drum 12 is positioned below the supply station.

The drum 12 is constituted by a frustum-shaped member having a half-angle at the apex equal to 45°. Drum 12 is mounted so as to rotate freely on a frame 14, the axis of said drum coinciding with the rotation spindle 16 screwed into said frame 14 at 45° with respect to the horizontal. The rotation of drum 12 about spindle 16 is permitted by at least one bearing 18, maintenance in translation being ensured in a conventional manner.

For example eight equidistant cavities or recesses 22 are made in barrel 12, in such a way that their axis forms an angle of 45° with the rotation spindle 16 and is secant with said spindle 16 at the same point. For each rotation by one eighth of a turn of drum 12, a cavity 22 is vertical and coaxial with the supply chute 10, the diametrically opposite cavity 22 then being horizontal.

Figure 8:
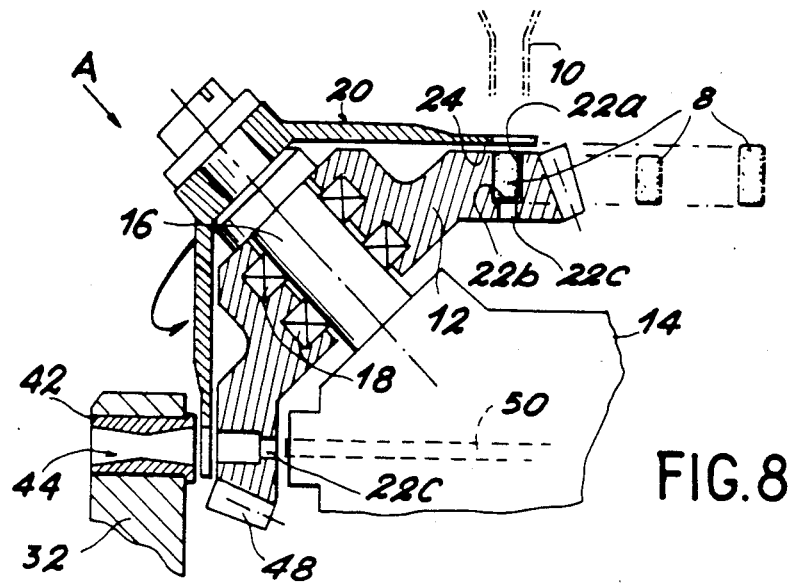
FIG. 8, in longitudinal section the transfer drum and device which is able to detect excessive nugget lengths.

Each of the cavities 22 is constituted by a cylindrical part 22a having a diameter significantly greater than the maximum diameter of the fuel nuggets 8 disposed in the alignment of chute 10 when the cavity is vertical and whose base 22b forms the inner end of the cavity (FIG. 8). A hole 22c, whose diameter is smaller than that of the nuggets is made and issues into said base coaxially with respect to part 22a. In this way, a nugget 8 can drop directly onto the base 22b of part 22a of the corresponding vertical cavity 22.

Figure 9:
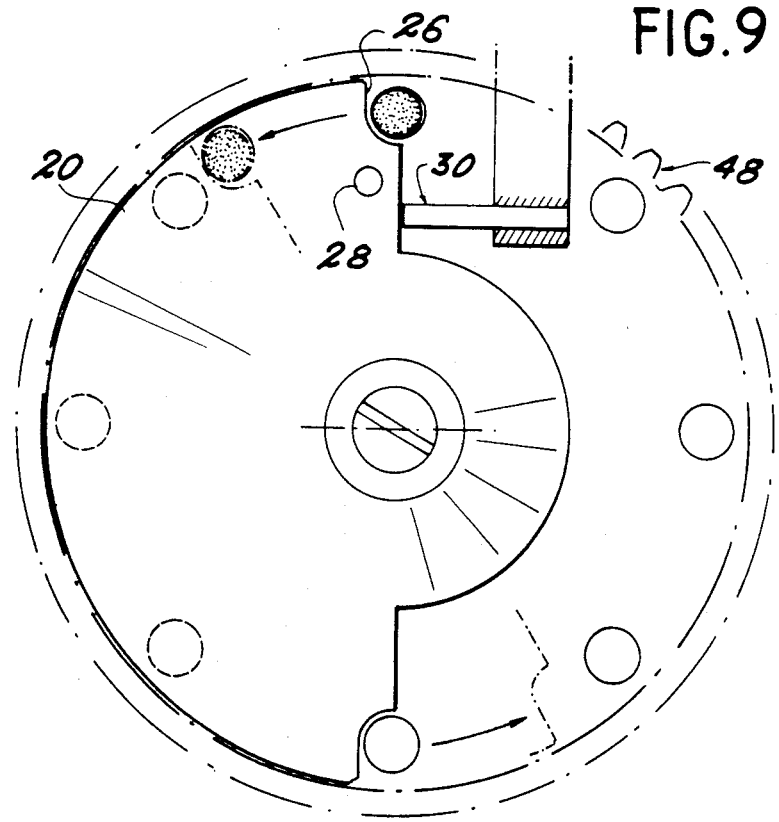
FIG. 9, a view in accordance with arrow A of FIG. 8 of the device able to detect excessive nugget lengths.

A device able to detect excessive lengths of the nuggets is shown in FIGS. 8 and 9. This device comprises a cap or cover 20 mounted in rotation on the end of the rotation spindle 16 and covering drum 12. The cover 20 is conical and assumes the shape of drum 12, the wall 24 of said cover facing the drum being located at a uniform distance from the base 22b of each of the cavities 22. This distance corresponds to the maximum permitted length of nuggets 18. The cover 20 has a cutout 26, which permits the passage of a nugget from chute 10 into the corresponding vertical cavity 22. When the length of a nugget exceeds the maximum permitted length during the rotation of drum 12, said pellet rotates the cover 20, as shown in mixed line form in FIG. 9. The rotation of cover 20 is detected by a sensor 28, such as an optical sensor which brings about the stoppage of the distributor. In normal operation, an abutment 30 is placed against cover 20 to prevent its rotation in the opposite direction to that of the drum and so that the cutout 26 is always correctly positioned.

A cylindrical calibrating plate 32 is mounted so as to rotate horizontally on frame 14 substantially below the drum 12. Plate 32 is fixed to one end of a horizontal shaft 34, whereof the guidance in rotation in frame 14 is ensured by two bearings 36, 38, the maintenance in translation being ensured by conventional means. The other end of shaft 34 is coupled to drive means 40.

The calibrating plate 32 has holes, e.g. eight holes, which are equidistant and arranged horizontally in accordance with the same diameter. A sleeve 42 is fixed in each of the holes and also has a calibrated hole 44. As is shown on a larger scale in FIG. 7a, said hole 44 has two frustum-shaped portions 44a, 44b, portion 44a facing the drum 12, whose intersection 44c is substantially in the centre of hole 44. The diameter of said intersection 44c constitutes the lower diameter of hole 44, which is equal to the maximum permitted diameter of the fuel nuggets 8.

The calibrating plate is also positioned in such a way that each calibrated hole 44 can successively occupy a raised position where said hole 44 faces a corresponding horizontal cavity 22. In said distribution position, a calibrated hole 44 and a cavity 22 are aligned in accordance with a horizontal or so-called distribution axis 45.

A conical toothed ring 46 is formed on the wall of the calibrating plate 32 on the side of shaft 34. Ring 46 cooperates with a conical toothed ring 48 formed on the periphery of drum 12 so as to from a gear. On each rotation by one eighth of a turn of plate 32 caused by the drive means 40, said gear permits a corresponding eighth of a turn rotation of drum 12. Thus, each cavity 22 and each calibrated hole 44 sequentially occupy the distribution position where they are aligned.

A distributor piston 50 is mounted with horizontal sliding in frame 14 coaxially with respect to said distribution axis 45. Piston 50 has a first larger diameter portion 50a sliding in a bore 52 of the frame and a second portion 50b sliding in a sleeve 54 fixed in frame 14. The diameter of the second portion 50b is slightly smaller than the diameter of hole 22c (FIG. 8) of each cavity 22. When a cavity 22 and a calibrated hole 44 are in the transfer position, piston 50 is able to penetrate said hole 22c and can then push a nugget 18 located in said cavity 22 up to the calibrated hole 44. If the diameter of the nugget is smaller than the maximum permitted diameter (in which case the nugget will be called "satisfactory", otherwise it will be called "unsatisfactory"), the piston 50 forces the nugget through the calibrated hole 44 up to a guide vee 56 positioned in the alignment of said distribution axis 45 and in the vicinity of calibrating plate 32 (FIG. 7a). The length of the guide vee 56 is adequate to permit the formation of the fuel nugget columns which are to be sheathed.

The means for actuating the distributor piston 50 will now be described in detail with reference to FIGS. 2 to 6.

Two cylindrical bars 58, 60, superimposed in a vertical plane, parallel to said distribution axis, are fixed in the lower part of frame 14 by two vertical flanges 62, 64.

The two bars 58, 60 serve as slides and supports for a mobile frame 66. To this end, the generally planar and vertical mobile frame 66 is provided in its lower part with two bores 68, 70 into which are respectively introduced the two bars 58, 60.

The mobile frame 66 is provided in its upper part with a substantially U-shaped cutout 72. Two rollers 74, 76 are mounted in horizontally pivoting manner, perpendicular to the transfer axis, on mobile frame 66 on either side of the latter respectively and in the vicinity of the opposite upper ends of cutout 72.

Two flat, ovoid cams 78, 80 are integral with a drive shaft 82 mounted in rotary manner in frame 14 perpendicular to said transfer axis 45 and substantially in the centre of cutout 72, when the mobile frame 66 is midway between the two flanges 62, 64. Shaft 82 is located in the same horizontal plane as the two rollers 74, 76.

Figure 5:
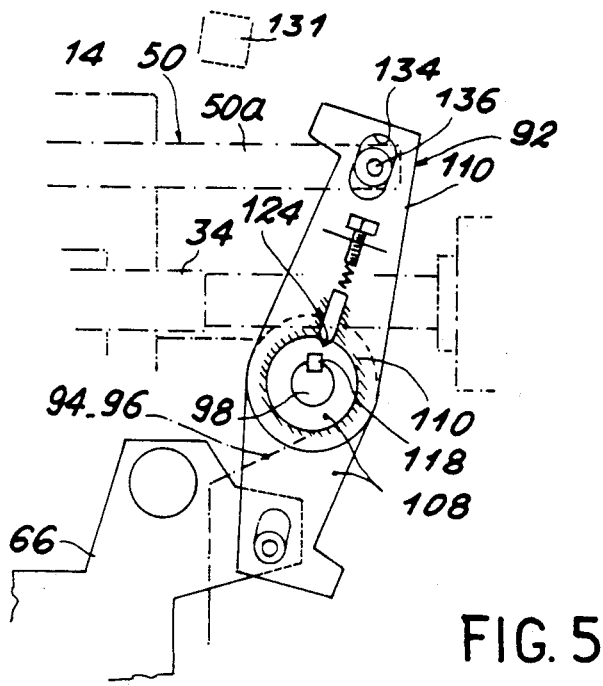
FIG. 5, a side view of the articulated lever.
Figure 6:
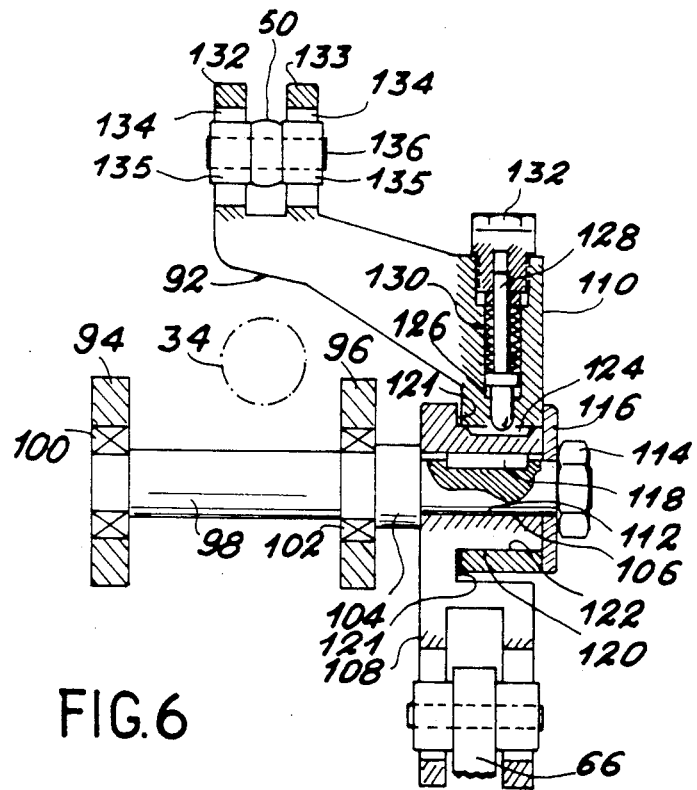
FIG. 6, in cross-section the articulated lever.

The two cams 78, 80 are located on either side of frame 66 and are applied to the two rollers 74, 76 respectively. As a result of the cooperation of the two cams 78, 80, mobile frame 66 performs an alternating movement parallel to said transfer axis when the drive shaft 82 turns. Shaft 82 is rotated by drive means 40 comprising a motor 84 driving a pulley 86 by a belt 88, said pulley 86 driving another pulley 87 integral with drive shaft 84 by a belt 89, which is tensioned by a turnbuckle 90. A lever 92 is pivotably mounted on frame 14, as shown in FIGS. 5 and 6.

For this purpose, two lugs 94, 96 project parallel and vertically of frame 14 below shaft 34 and on the side opposite to the calibrating plate 32. A support spindle 98 is mounted so as to rotate freely perpendicular to the transfer axis 45 on said two lugs 94, 96 as a result of two bearings 100, 102, whilst being maintained in translation by conventional means.

The support spindle 98 has a part which projects beyond lug 96. This part has a shoulder 104 bearing against bearing 102 and then a cylindrical portion 106 provided at its ends with a thread.

Lever 92 incorporates a lower lever 108 and an upper lever 110. The upper part of the lower lever 108 has a bore 112 placed on the cylindrical portion 106 up to shoulder 104 and maintained in translation by a washer 116 and a nut 114 screwed on the thread. A key 118 prevents the rotation of the lower lever 108 with respect to the support spindle 98. The lower lever 108 has an outer cylindrical portion 120 coaxial to its bore 112 and limited by shoulder 121.

The lower portion of the upper lever 110 has a bore 122 placed on said cylindrical portion 120. Washer 116 has an adequate diameter to maintain the upper lever 110 between itself and the shoulder 121.

A groove 124 having a V-shaped section is formed on the cylindrical portion 120 parallel to the axis thereof. A hole 126 is made in the upper lever 110 in accordance with a radial axis with respect to its bore 122. A rod 128 slides in said hole 126 and in normal operation issues into groove 124. Rod 128 is applied to said groove 124 with a certain force by means of a spring 130 maintained under compression by a plug 132 screwed into hole 126.

When rod 128 is engaged in groove 124, it behaves like a key and keeps the lower lever 108 and upper lever 110 joined together. If the upper lever 110 is blocked and the lower lever 108 receives a rotation torque, rod 128 rises along the walls of groove 124 in opposition to the force exerted by spring 130, until the rod 128 passes out of the groove. The lower lever 108 is then disengaged from the upper lever 110. A detector 131 is provided for emitting an alert signal when lever 92 is disengaged (FIGS. 2 and 5).

The upper portion of the upper lever 110 is subdivided into two fork arms 132, 133. A substantially vertical oblong hole 134 is formed in each of said arms. The free end of the first portion 50a of piston 50 has two parallel flats arranged between the two fork arms 132, 133. A horizontal spindle 136 passes perpendicularly through said end and penetrates the oblong holes 134 via two rollers 135. A rotary displacement of lever 92 can consequently actuate piston 50 in translation.

In the same way, the lower portion of the lower lever 108 is connected to one end of the mobile frame 66. A displacement in translation of mobile frame 66 then brings about a displacement in rotation of lever 92.

In overall terms, the alternating displacement of mobile frame 66 is transformed into an alternating displacement of piston 50 by lever 92, when the latter is not disengaged.

One end of the mobile frame 66 has an ejector piston 138 and a brush piston 140 arranged parallel to the transfer axis 45, each facing a calibrated hole 44 of the calibrating plate 32. They are able to enter holes 44 by the face of the calibrating plate 32 opposite to drum 12. Pistons 138 and 140 follow the alternating movement of the mobile frame 66, the ejector piston 138 penetrating the corresponding hole 44 to eject a possible unsatisfactory nugget 8 jammed in said hole (FIGS. 7b and 7c). The brush piston 140 then enters the following hole 44 to clean it.

The ejected nuggets drop into a waste container 162 positioned beneath the calibrating plate 32 via a chute 163.

The operation of the calibrating distributor according to the invention will now be described. Firstly, the vibrating bowl is filled with fuel nuggets 8, which are agitated and then drop in line in the supply chute 10.

For each rotation by one step of the drum 12, a nugget 8 drops into the corresponding vertical cavity 22. When the drum has turned by one step four times, i.e. half a turn, the nugget is then positioned to the right of the distribution station. The distributor piston 50, which is actuated on each advance by one step of the drum, forces the nugget into the corresponding calibrated hole 44 of the calibrating plate 32.

If the nugget is satisfactory it passes through the hole and the piston 50 pushes it up to the guide V 56, where a column of nuggets is formed (FIG. 7a).

If the nugget is unsatisfactory, it jams in portion 44a of hole 44 (FIG. 7b). The piston 50 cannot then continue its travel normally, because it is blocked by the unsatisfactory nugget. The mobile frame 66 continues its travel, which brings about the disengagement of lever 92, the upper lever 110 remaining stationary like piston 50, the rotary lower lever 108 being pushed by the mobile frame 66. A detector 131 then emits an alert signal and controls the slowing down of the distributor. When the calibrating plate 32 has rotated five times by one step, the unsatisfactory nugget is positioned to the right of the ejection station. The ejector piston 138, which is actuated on each advance by one step of the plate forces the unsatisfactory nugget out of hole 44 (FIG. 7c) and it then drops into the waste container 162.

The plate turns by one step and the corresponding hole 44 is then positioned in front of the brush piston 140, which is then actuated for each advance by one step of the plate for cleaning said hole 44. The normal operating speed is resumed after a complete turn. the normal speed is approximately 4 nuggets per second.

A description has been given of the possible paths for a nugget, but it is obvious that for each step of plate 22 and drum 12 one nugget is introduced, another nugget is pushed by piston 50, a possible unsatisfactory nugget is ejected by ejector piston 138 and a hole 44 is cleaned by brush piston 140.

All the movements of piston 50, mobile frame 66, calibrating plate 32 and therefore drum 12 are coordinated by drive means 40. The operating speed of e. g. the mobile frame 66 is adjusted in order to actuate piston 50 only when the plate is stopped at a marking and the corresponding cavity 22 and hole 44 are aligned.

In certain cases, a nugget can drop from the supply station into cavity 22 in the vertical position with a fragment of another nugget, or quite simply a nugget, whose length exceeds the maximum permitted length drops into said cavity 22. When the drum turns by one step, the excessively long nugget rotates the cover 20. The optical sensor 28 detects the movement of the cover and releases an alert signal which stops the distributor. The nugget is then removed manually, the cover 20 repositioned against abutment 30 and the distributor is started up again.

Obviously, the above description has only been given in an exemplified manner and all modifications can be envisaged without passing beyond the basic principle of the invention. For example, consideration can be given to a planar circular transfer drum, whose rotation axis or spindle is parallel to that of the calibrating plate. The supply then takes place horizontally and the device for detecting excessive lengths is formed by a flat plate. It is also possible to consider a connecting rod - crank device for alternately driving the mobile frame 66. Instead of the lever being in two parts, it is possible to disengage the lever from the piston or make the piston in two parts, force or stress limiting means being positioned between the two parts.

What is claimed is:

1. A calibrating distributor for cylindrical members comprising a cylindrical member supply station, a distribution station for said members, an ejection station for the cylindrical members whose diameter exceeds a maximum accepted diameter, a drum for transferring these members between the supply station and the distribution station, said drum having equidistant cavities, each of which can receive one of the said members, a calibrating plate able to transfer between the distribution station and the ejection station the cylindrical members whose diameter exceeds the maximum accepted diameter, said plate having at least partly frustum-shaped, equidistant calibrated holes, whose internal diameter is equal to the maximum accepted diameter, means for the stepwise rotation of the transfer drum and the calibrating plate for successively passing each cavity in front of the supply station and the distribution station and each hole in front of the distribution station and the ejection station, in such a way that a cavity and a hole are aligned opposite to the distribution station, the distribution station having means for forcing the cylindrical members contained in the cavities through the calibrated holes with a maximum predetermined force, in such a way that only the cylindrical members with a diameter smaller or substantially equal to the maximum accepted diameter pass through said holes, the members having a diameter larger than said maximum diameter remaining jammed in said holes and the ejection station has means for ejecting the cylindrical members jammed in said hole.

2. A calibrating distributor for cylindrical members according to claim 1, wherein the means in the distribution station for forcing the cylindrical members comprise a mobile frame guided in translation by a fixed slide, whose axis is parallel to said aligned hole and cavity, drive means permitting an alternating movement of the mobile frame, a first end of a lever being pivotably mounted on the mobile frame about a rotation axis perpendicular to said slide axis, the other end of the lever being pivotably mounted at the end of a distributor piston, said piston being mobile in translation and performs an alternating movement in an axis coinciding with the aligned cavity and hole facing the distribution station.

3. A calibrating distributor of cylindrical members according to claim 2, wherein stress limiting means are placed between the assembly constituted by said lever and said distributor piston, the stress limiting means not transmitting to the piston the movement of the mobile frame when the piston is blocked by a cylindrical member having a diameter exceeding the maximum accepted diameter and jammed in a hole of the calibrating plate.

4. A calibrating distributor of cylindrical members according to claim 2, wherein the ejection station means comprise an ejector piston fixed to the mobile frame parallel to the aligned hole and cavity, so as to successively penetrate each of the holes of the calibrating plate and eject the cylindrical members jammed in said holes.

5. A calibrating distributor of cylindrical members according to claim 1, wherein a device able to detect excessive cylindrical members lengths is placed on the transfer drum and has a freely rotating plate, whose wall facing the drum is located at a uniform distance from the lower end of each of the cavities corresponding to a maximum permitted length of the cylindrical members, said plate having a cutout normally positioned facing the supply station and means for detecting a rotation of said plate by a cylindrical member exceeding said permitted maximum length.

6. A calibrating distributor of cylindrical members according to claim 1, wherein the transfer drum and calibrating plate each have a toothed ring, the rings forming a gear.

* * * * *